United States Patent [19]

Sanders

[11] 4,104,930
[45] Aug. 8, 1978

[54] FINAL DRIVE GUARD

[76] Inventor: Thomas E. Sanders, 4135 Holly Hollow, Conroe, Tex. 77302

[21] Appl. No.: 751,606

[22] Filed: Dec. 17, 1976

[51] Int. Cl.² .......................... F16P 1/00; G05G 25/00
[52] U.S. Cl. .................................................... 74/609
[58] Field of Search .......................... 74/609, 608, 611

[56] References Cited

U.S. PATENT DOCUMENTS

| 1,131,167 | 3/1915 | Spencer | 74/609 |
| 3,815,439 | 6/1974 | Tarutani | 74/611 |
| 4,044,621 | 8/1977 | McGregor, Sr. et al. | 74/611 X |

Primary Examiner—Leonard H. Gerin
Attorney, Agent, or Firm—Pravel, Wilson & Gambrell

[57] ABSTRACT

A wire guard for protecting the final drive shaft on a crawler tractor to prevent the accumulation of wire strands on the final drive shaft between the drive sprocket and the shaft housing or case. The guard comprises overlapping and interlocking sleeve segments on the shaft housing and on the drive sprocket, respectively.

3 Claims, 1 Drawing Figure

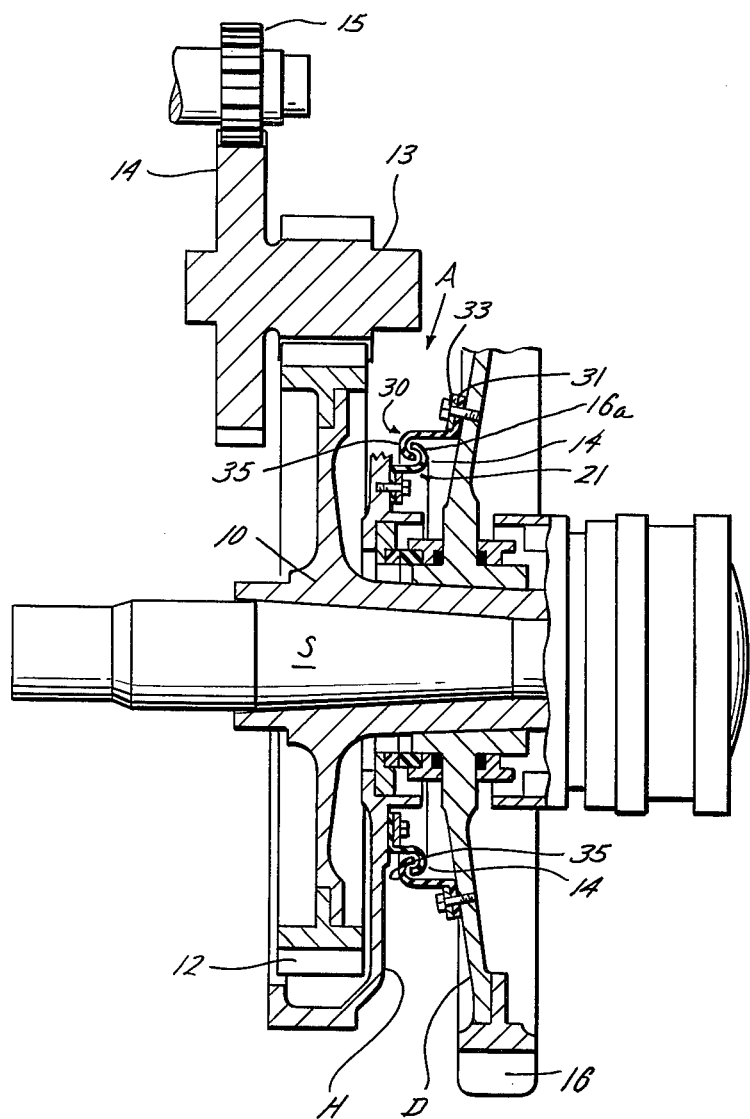

FINAL DRIVE GUARD

BACKGROUND OF THE INVENTION

Crawler tractor devices run on endless loops of connected track segments which are carried by rollers and driven by drive sprockets. The drive sprockets are mounted on final drive shafts which protrude from a final drive housing. The drive shaft and its associated sprocket rotate relative to the surrounding housing or case which encases the drive gears. The rotary motion of the final drive shaft and its sprocket tend to pick up strands of wire which are encountered in the operation of the crawler tractor. This is particularly troublesome in landfills or other operations where scrap pieces of wire are found. As the wire is picked up, jammed between the drive sprocket and case and wound ever and evermore tightly around the drive shaft, the accumulation of wound wire scraps becomes so large and bulky that it impedes the operation of the crawler tractor. In these instances, it has been necessary or expedient to cut accumulated wire with a cutting torch to remove it from the shaft. This is a time-consuming process which adds to the cost of maintenance of the crawler equipment involved.

As lengths of scrap wire are often found in landfills, there is a continuing problem of wire removal when it collects on the drive shaft of the final drive. Also, it will be appreciated that scraps of wire can be found in virtually any situation in which a crawler tractor is used, particularly if it is one of the bulldozer type.

SUMMARY OF THE INVENTION

The present invention provides a new and improved shield or guard for protecting a final drive shaft from unwanted accumulations of wire strands. Such wire guard comprises interlocking and overlapping rings or guard members which surround the final drive shaft and the opening in the housing through which it extends.

BRIEF DESCRIPTION OF THE DRAWING

The drawing, partly in section and partly in elevation, shows the wire guard mounted on a shaft housing and drive sprocket.

DESCRIPTION OF THE PREFERRED EMBODIMENT

As shown in the drawing, the final drive wire guard of the present invention, designated A in the drawing, is positioned on a drive housing H and a drive sprocket D so as to encircle the final drive shaft S which extends through the wire guard A.

The final drive shaft S is splined to the final drive hub 10 which projects outwardly through an opening 11 in the case or housing H. The drive hub 10 carries a ring gear 12 having teeth which engage corresponding teeth on the idler pinion 13 in the conventional manner. Similarly, the idler pinion 13 has a second gear 14 which engages the final drive pinion gear 15. Also, the drive sprocket D is carried on the end of the drive hub 10 which projects out of the case H. The drive sprocket has teeth 16 which engage the track of the crawler tractor.

The wire guard A comprises a first or inner ring 21 which is mounted on the drive housing H as by tack welding, bolts or other suitable securing means. The inner ring 21, formed of a circular band, has an outwardly flared U-shaped lip 14 which extends around the circumference of the ring 21. The U-shaped lip 14 is formed by rolling or curling the outer edge 16a of the band back upon itself so as to provide a space between the band and the outer edge 16a for receiving one edge of the outer ring as will be described in detail hereinafter.

The outer ring 30, somewhat larger in diameter than the inner ring 21, is also formed of a circular band. The ring 30 has an annular shoulder or flange 31 extending outwardly from its base edge. Such flange is provided with circumferentially spaced openings for receiving securing bolts 33 for securing the ring 30 to the drive sprocket D.

The outer band 30 has an inwardly curved or turned annular lip 35 which interlocks in the channel formed by the outwardly turned annular lip 16a. Similarly, the inwardly turned lip or edge 35 is inserted into the U-shaped groove or channel formed in the ring 21. Thus, when the rings 21 and 30 are positioned on the housing H and the sprocket S, respectively, their outer curved ends, 16a and 35, are interlocked to form the wire guard of the present invention for protecting the shaft S against the accumulation or built-up of stray bids or lengths of scrap wire that are encountered by the tractor in working a landfill or in some other environment where pieces or lengths of wire are found.

It will be appreciated that the rings 21 and 30 may each be formed of a single piece or, if desired, for ease of manufacture, or ease of installation, or both, the rings may be split or segmented into half circle pieces and fit together to form substantially continuous circular pieces which have their adjacent edges in overlapping and interlocking relationships.

The foregoing disclosure and description of the invention are illustrative and explanatory thereof, and various changes in the size, shape, and materials as well as in the details of the illustrated construction may be made without departing from the spirit and scope of the invention.

I claim:

1. A wire guard for the final drive of a crawler tractor comprising:
   an inner ring having an outwardly turned edge forming a U-shaped channel for receiving one edge of an outer ring; and
   an outer ring having an inwardly turned U-shaped channel for receiving one edge of an inner ring, with one of said rings fixed and the other ring movable relative thereto whereby the rings form a pair of sleeves for protecting the final drive shaft from a built-up of pieces of wire.

2. The invention of claim 1, wherein:
   the inner ring is secured to the final drive shaft housing; and
   the outer ring is secured to the final drive shaft sprocket.

3. The invention of claim 1, wherein:
   the outer ring is provided with an annular flange having circumferentially spaced bolt holes for bolting said outer ring to the final drive sprocket.

* * * * *